J. McLACHLAN.
DEVICE FOR OPENING AND CLOSING CHAIN LINKS.
APPLICATION FILED MAY 27, 1919.
1,409,876.
Patented Mar. 14, 1922.
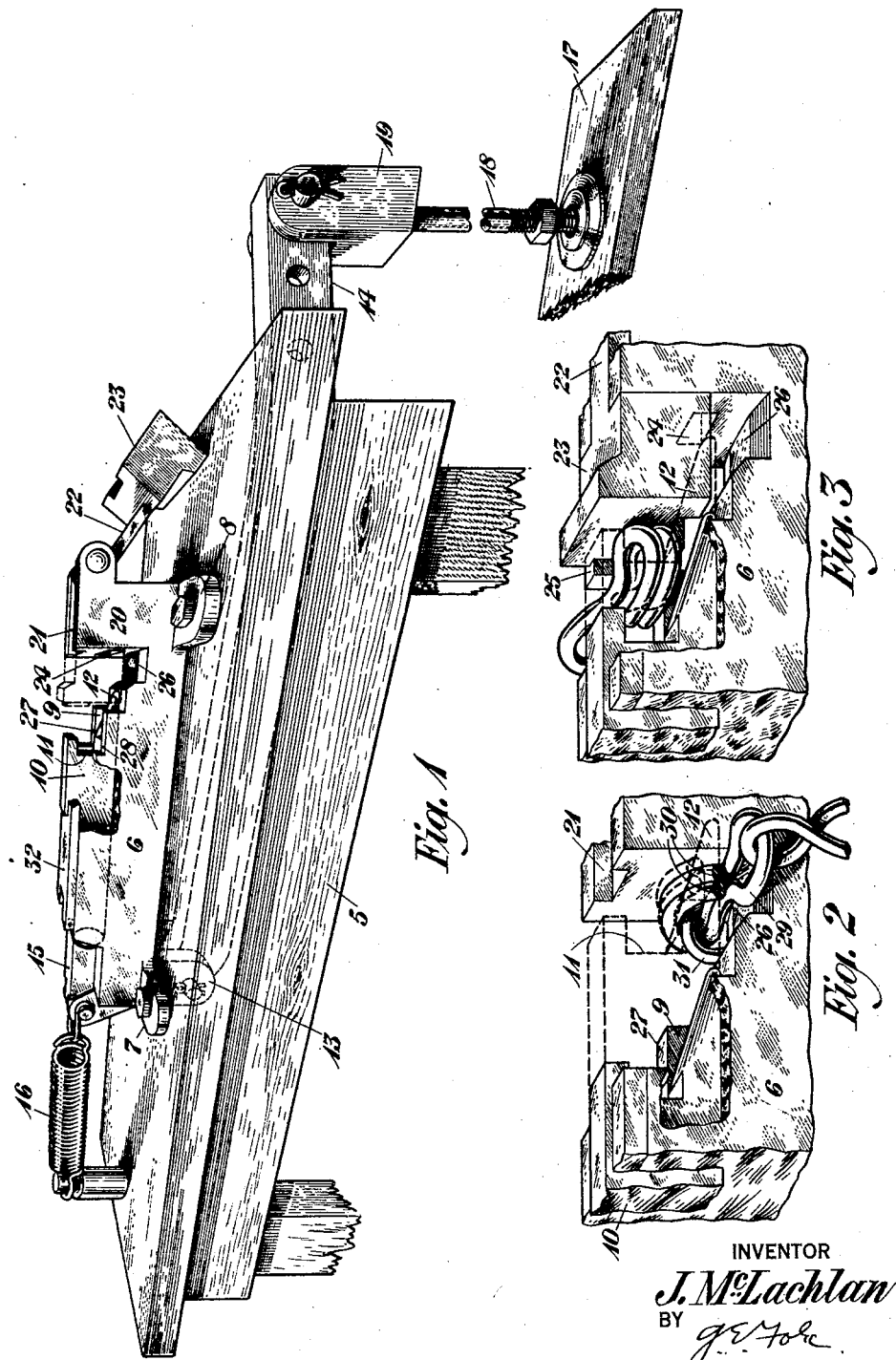
INVENTOR
J. M<sup>c</sup>Lachlan
BY
ATTORNEY

UNITED STATES PATENT OFFICE.

JOHN McLACHLAN, OF EAST ELMHURST, NEW YORK.

DEVICE FOR OPENING AND CLOSING CHAIN LINKS.

1,409,876.

Specification of Letters Patent. Patented Mar. 14, 1922.

Application filed May 27, 1919. Serial No. 300,170.

*To all whom it may concern:*

Be it known that I, JOHN McLACHLAN, residing at East Elmhurst, in the county of Queens and State of New York, have invented certain Improvements in Devices for Opening and Closing Chain Links, of which the following is a specification.

This invention relates to devices for repairing chains, and more particularly to arrangements of this character which are adapted for use in connection with automobile skid chains.

For the prevention or alleviation of skidding of automobiles, it is customary to provide the tires thereof with chains. These skid chains are ordinarily made up of side chains which are placed in parallel circumferentially about the sides of the tires and cross chains which connect the parallel chains at suitable intervals. The cross chains pass over the outer rounded surface or tread of the tire and are secured to the parallel chains by means of links. The cross chains are necessarily subjected to a great deal of wear, and for this reason need to be frequently removed and replaced by new chains. Various hand tools have been previously used for removing and replacing these chains, but these tools involve complicated and time consuming operations. One of the cardinal features of this invention consists in the provision of a machine whereby a defective cross chain may be removed from its associated parallel side chains and readily replaced by a new one in a simple and expeditious manner. Other and further features of the invention will hereinafter appear.

The purposes of this invention are carried out by the provision of a plunger adapted to move horizontally within a guideway. The plunger is provided with a wedge-shaped blade and a head member. The blade is used for opening a chain link of a defective cross chain, said blade in operation entering and passing through the looped ends of a link thereby spreading the said ends away from the main portion of the link so that it may be disengaged from its associated side chain. For attaching a new cross chain the open terminating links thereof are hooked to the parallel side chains and a closing pressure applied to the ends of the links by the plunger head. In the closing operation a hinged anvil is employed which cooperates with said plunger head as will later appear.

In the accompanying drawing, in which like numerals designate like parts throughout, Figure 1 illustrates in perspective one embodiment of the invention, and in Figs. 2 and 3 are shown broken perspective views of the device, the dotted lines indicating said device in its operated condition for disengaging and replacing, respectively, a terminating link of a cross chain.

Referring to the construction shown, 5 indicates a support upon which is mounted a frame 6 which is secured to said support in any suitable manner, as by means of lugs 7 and 8 bolted thereto. The frame 6 is provided with a slot or guideway 9 in which slides a plunger 10, comprising a head 11 and a wedge shaped blade 12. The frame 6 is also provided with depending arms 13 upon which the lever 14 is suitably fulcrumed. A link 15 connects one end of the plunger 10 with the lever 14, and for holding said plunger and lever in retracted position tension means, such as spring 16 may be used. Adjustably attached to a foot-treadle 17 is a rod 18 which carries a bifurcated head 19, said head being suitably fixed to one end of the lever 14. An integral tail-stock 20 is formed at one end of the frame 6 and has provided in its surface a groove or recess 21 for seating arm 22 of anvil 23, said anvil being hinged as shown to the tail-stock 20. Formed at one side of said anvil is a shoulder or jaw 25. An aperture 24 is formed in the tail-stock for the reception of the end of blade 12 when it is in its operated position and forwardly of said aperture 24 and integral with frame 6 is a depression 26 upon which may be placed a terminating link of a defective cross chain when it is desired to remove said chain from the parallel side chains. Members 27 and 28 provide a seat upon which may be placed the terminating links of a new chain in the operation of replacement. A plate 32 is suitably secured to the upper portion of frame 6, and serves as a stop for the plunger 10 in its retracted position.

The invention may now be more fully understood from the following description of its operation.

When it is desired to remove a defective cross chain from its associated side chains, one of the terminating links 29 of said cross chain is placed upon depression 26 in a manner similar to that illustrated in Fig. 2. The terminating links are generally of the configuration shown and their closed ends hold them attached to the side chain of which is shown the link 31. Pressure is then applied to the treadle 17 causing lever 14 to transmit to the member 15 and plunger 10 a horizontal movement whereby said plunger is moved within the guideway 9 toward tailstock 20. The pressure on treadle 17 is continued until the tapered end of blade 12 passes through the link sufficiently to force the ends of said link away from the main portion thereof, as indicated in dotted lines in Fig. 2, thereby providing adequate clearing space between the ends and main portion of the link whereby said link may be disengaged from link 31. Pressure is then withdrawn from said treadle and by means of spring 16 the plunger 10 assumes its retracted or normal position. The operation just outlined may be repeated for the removal of the other terminating link, and the defective chain may thus be freed from the parallel side chain.

Cross chains are furnished from the manufacturer with links attached to each end thereof. The ends of the links are open as shown in Fig. 3 so that they may be readily hooked to the parallel side chains, said side chains not being illustrated in this instance for the sake of clearness. For the operation of closing the ends of the links in order that the cross chains may be secured to the side chains, each link after being hooked to the side chain is placed upon the seat comprising members 27 and 28, as illustrated in Fig. 3. The hinged anvil 23 is thrown to its forward position and pressure applied to the treadle 17, thus causing the plunger 10 to be moved within the guideway 9 toward the anvil 23. When anvil 23 is thrown to its forward position it partially covers the blade 12, so that said blade will pass idly beneath a link when said link is seated for its closing operation on members 27 and 28. The head 11 of said plunger forces the link against the surface of anvil 23 and jaws 25 and applies pressure to the ends of the link, thereby closing them as indicated in dotted lines in Fig. 3.

While the improved device is illustrated and described in connection with the removal and replacement of terminating links of cross chains from parallel side chains of automobile skid chains, it will be obvious that said device is adapted for use in connection with links of other chains or similar arrangements.

From the foregoing it is thought that the construction, operation and many objects of the hereindescribed invention will be apparent to those skilled in the art without further description and it will be understood that various changes in the size, shape, proportion and minor details of construction may be resorted to without departing from the spirit or sacrificing any of the objects of the invention.

Having thus described the invention, what I desire to secure by Letters Patent is:

1. In a device of the character described, a frame, a guide-way therein, a plunger reciprocating in said guide-way comprising a head member to close a chain link and a tapered blade member to open a chain link, means associated with said frame for holding a chain link in position to be closed by said head member, a second means associated with said frame for holding a chain link in position to be opened by said tapered blade member, and means for reciprocating said plunger in said guideway to close a chain link held by said first holding means or to open a chain link held by said second holding means.

2. In a device for spreading a chain link comprising a frame, a guideway therein, a plunger reciprocating in said guideway, a tapered blade member formed on said plunger for engaging said link, a tail member integral with said frame, said tail member and frame being formed to hold a chain link in position to be opened by said tapered blade, and means associated with said plunger for causing said blade member to enter and spread said link.

3. In a device of the character described, a frame, a guideway therein, a plunger for reciprocating in said guideway comprising a head member, a tail member affixed to said frame, an anvil pivotally associated with the tail member coacting with said head member for operating on the link of a chain, a lever arm pivotally associated with said plunger and frame, a treadle for operating said plunger in one direction, a spring associated with said plunger for biasing the same to another position, and means for limiting the movement of said plunger in response to its bias.

4. In a device of the character described, a frame, a guideway therein, a plunger for reciprocating in said guideway comprising a head member, a tail member affixed to said frame, an anvil pivotally associated with said tail member having a shoulder formed thereon, said anvil and shoulder coacting with said head member for operating on the link of a chain, a lever arm pivotally associated with said plunger and frame, a treadle for operating said plunger in one direction, a spring associated with said plunger for biasing the same to another position and means for limiting the movement of said plunger in response to its bias.

In testimony whereof, I have signed my name to this specification this 24th day of May 1919.

JOHN McLACHLAN.